US010864463B2

(12) United States Patent
Wu et al.

(10) Patent No.: US 10,864,463 B2
(45) Date of Patent: Dec. 15, 2020

(54) DEEP CONE THICKENER WITH UNDERFLOW CONCENTRATION RAPID AUTO-ADJUSTMENT

(71) Applicant: University of Science and Technology Beijing, Beijing (CN)

(72) Inventors: Aixiang Wu, Beijing (CN); Shaoyong Wang, Beijing (CN); Zhuen Ruan, Beijing (CN); Shenghua Yin, Beijing (CN); Hongjiang Wang, Beijing (CN); Yiming Wang, Beijing (CN); Jiandong Wang, Beijing (CN)

(73) Assignee: UNIVERSITY OF SCIENCE AND TECHNOLOGY BEIJING, Beijing (CN)

( * ) Notice: Subject to any disclaimer, the term of this patent is extended or adjusted under 35 U.S.C. 154(b) by 73 days.

(21) Appl. No.: 16/464,297

(22) PCT Filed: May 30, 2018

(86) PCT No.: PCT/CN2018/089049
§ 371 (c)(1),
(2) Date: May 28, 2019

(87) PCT Pub. No.: WO2019/184079
PCT Pub. Date: Oct. 3, 2019

(65) Prior Publication Data
US 2020/0261828 A1    Aug. 20, 2020

(30) Foreign Application Priority Data
Mar. 29, 2018  (CN) .......................... 2018 1 0272655

(51) Int. Cl.
*B01D 21/01*    (2006.01)
*B01D 21/08*    (2006.01)
(Continued)

(52) U.S. Cl.
CPC ............. *B01D 21/01* (2013.01); *B01D 21/08* (2013.01); *B01D 21/2427* (2013.01);
(Continued)

(58) Field of Classification Search
CPC ..................................................... B01D 21/01
See application file for complete search history.

(56) References Cited

FOREIGN PATENT DOCUMENTS

| CN | 201135796 Y | 10/2008 |
|---|---|---|
| CN | 101468262 A | 7/2009 |

(Continued)

OTHER PUBLICATIONS

Yang, Liuhua et al. Regulation and a Mathematical Model of Underflow in Paste Thickeners Based on a Circular System Design, Chinese Journal of Engineering, Nov. 6, 2017, pp. 1507-1511, vol. 39 No. 10.

*Primary Examiner* — Peter Keyworth
(74) *Attorney, Agent, or Firm* — Bayramoglu Law Offices LLC

(57) ABSTRACT

A deep cone thickener with an underflow concentration rapid auto-adjustment pertains to the technical field of mining tailing disposal. The thickener includes a shell body, a dilution flocculation system, a shearing dewatering system, an underflow circulatory system, and an auto-control system. The shell body includes a thickener pool wall, a cone body, and a collection cylinder. The dilution flocculation system includes a feed pipe, a flocculant charging pipe, and a central feed well. The shearing dewatering system includes a drive motor, a drive shaft, and a rake. The underflow circulatory system includes discharging valves, underflow pumps, circulatory pipes, and a concentration meter. The auto-control system includes a PLC control system. During the underground paste filling, the dilution flocculation system and shearing dewatering system can form a paste slurry.

(Continued)

When there is no need for underground backfill, the underflow circulatory system is used to lower the underflow concentration rapidly.

4 Claims, 2 Drawing Sheets

(51) Int. Cl.
    *B01D 21/24*         (2006.01)
    *B01D 21/32*         (2006.01)

(52) U.S. Cl.
    CPC .......... *B01D 21/2444* (2013.01); *B01D 21/32* (2013.01); *B01D 2221/04* (2013.01)

(56) References Cited

FOREIGN PATENT DOCUMENTS

| | | |
|---|---|---|
| CN | 101469614 A | 7/2009 |
| CN | 103816702 A | 5/2014 |
| CN | 203894646 U | 10/2014 |
| CN | 205007647 U | 2/2016 |
| CN | 205007656 U | 2/2016 |
| CN | 206934815 U | 1/2018 |
| JP | 2017013020 A | 1/2017 |
| WO | 0012192 A1 | 3/2000 |

# DEEP CONE THICKENER WITH UNDERFLOW CONCENTRATION RAPID AUTO-ADJUSTMENT

CROSS REFERENCE TO RELATED APPLICATIONS

This application is the national phase entry of International Application PCT/CN2018/089049, filed on May 30, 2018 which is based upon and claims priority to Chinese Patent Application No. CN 201810272655.2, filed on Mar. 29, 2018 the entire contents of which are incorporated herein by reference.

TECHNICAL FIELD

The present invention relates to the technology of mine tailing disposal, particularly to a deep cone thickener with an underflow concentration rapid auto-adjustment.

BACKGROUND

The mining of underground mineral resource produces a large amount of solid wastes such as tailings, which can severely affect the mining safety and pollute the ecological environment. While, the paste technology can provide a safe, environment-friendly, and effective method for disposing of the tailings. A deep cone thickener is the core of the paste technology. After the tailings with a low concentration are discharged from the mineral processing plant and enter the deep cone thickener, the concentration of the tailings rapidly and substantially increases under the chemical action of the flocculant and the stirring shearing action of the rake. The underflow with a high concentration in the thickener is prepared into a paste filling slurry with no bleed water with other filling materials. The paste filling slurry is then pumped to the underground goaf for backfill. However, in the practical mining production, the tailings are not completely consumed by the underground backfill, and there is still a part of tailings that needs to be discharged to the ground surface. Due to the different transportation distances of the underground backfill and the discharge to the ground surface, the requirements for the filler strength are different. Namely, the paste slurry for the underground backfill should have a higher concentration, while the paste slurry for discharging to the ground surface may have a relatively lower concentration. In the normal underground backfill process, the underflow of the deep cone thickener has a high concentration. While, when there is no need for the underground backfill, the underground backfill should be shifted to the ground surface discharge, and the concentration of the underflow should be decreased rapidly. Then, if there is a need for the underground backfill again, the concentration of the underflow should be increased rapidly. Therefore, it is particularly imperative to provide a deep cone thickener with an underflow concentration rapid auto-adjustment, which not only can satisfy the requirement of the paste filling, but also can solve the issue of the long-distance discharging of the tailings with a high concentration, so as to reduce the investment cost and increase the utilization efficiency of equipment.

SUMMARY

It's an objective of the present invention to provide a deep cone thickener with an underflow concentration rapid auto-adjustment to solve the technical problems.

The thickener includes a shell body, a dilution flocculation system, a shearing dewatering system, an underflow circulatory system, and an auto-control system, wherein the shell body includes a thickener pool wall, a cone body, and a collection cylinder; the thickener pool wall is located at the exterior of the thickener, the cone body is located below the thickener pool wall, and the collection cylinder is located below the cone body; the dilution flocculation system includes a feed pipe, a flocculant charging pipe, and a central feed well, wherein the central feed well is located at the inner upper part of the thickener pool wall, the feed pipe is located at the upper part of one side of the central feed well, an end of the feed pipe penetrates through the thickener pool wall and extends into an interior of the central feed well, and the flocculant charging pipe is vertically connected to the feed pipe from an upper side of the feed pipe; the shearing dewatering system includes a drive motor, a drive shaft, and a rake, wherein the drive motor is located at the outer upper part of the thickener pool wall, the drive shaft and the rake are located inside the thickener pool wall, and the drive motor is connected to the rake through the drive shaft; the underflow circulatory system includes three circulatory subsystems, each circulatory subsystem includes a discharging valve, an underflow pump, and circulatory pipe, the inlets of the underflow pumps are connected to the discharging outlets of the collection cylinder, and the outlets of the underflow pumps are connected to a high circulatory feedback port and a middle circulatory feedback port of the thickener pool, and a low circulatory feedback port of the cone body through a high circulatory pipeline, a middle circulatory pipeline, and a low circulatory pipeline, respectively, the high circulatory feedback port, the middle circulatory feedback port, and the low circulatory feedback port are provided with discharging valves on the high circulatory pipeline, the middle circulatory pipeline, and the low circulatory pipeline, respectively; and the auto-control system includes a PLC control system that is connected to the underflow pumps, a concentration meter, and the discharging valves.

Specifically, the discharging valves include a first valve, a second valve, a third valve, a fourth valve, a fifth valve, a sixth valve, a seventh valve, an eighth valve, a ninth valve, a tenth valve, an eleventh valve, and a twelfth valve, and the underflow pumps include a first underflow pump, a second underflow pump, and a third underflow pump.

The number of the high circulatory feedback port, the middle circulatory feedback port, the low circulatory feedback port, and the discharging outlets are all three, the three high circulatory feedback ports are all located at the same cross-section of the thickener pool wall with an angle of 120° to each other, and the three middle circulatory feedback ports, the three low circulatory feedback ports, and the three discharging outlets are vertically aligned with the corresponding high circulatory feedback ports; the centers of the high circulatory feedback ports are located at positions with about one third height distance of the thickener wall lower than the top of the thickener pool wall in the vertical direction, the centers of the middle circulatory feedback ports are located at positions with about one fifth height distance of the thickener wall higher than the bottom of the thickener pool wall in the vertical direction, the centers of the low circulatory feedback ports are located at positions with about one fifth height distance of the cone body lower than the top of the cone body in the vertical direction, and the centers of the discharging outlets are located at positions with about one fourth height distance of the collection cylinder higher than the bottom of the collection cylinder in the vertical direction.

Two of the three circulatory subsystems of the underflow circulatory system have the same structure, wherein, the first circulatory subsystem includes the sixth valve, the second underflow pump, the seventh valve, the eighth valve, the ninth valve, and the tenth valve, the tenth valve, the ninth valve, and the eighth valve are respectively connected to the high circulatory feedback port, the middle circulatory feedback port, and the low circulatory feedback port, the inlets of the tenth valve, the ninth valve, and the eighth valve are successively connected to the seventh valve, the second underflow pump, and the sixth valve and then to a discharging outlet of the collection cylinder; the second circulatory subsystem has the same structure as the first circulatory subsystem; the third circulatory subsystem includes the first valve, the first underflow pump, the concentration meter, the third valve, the fourth valve, the fifth valve, and the eleventh valve, the fifth valve, the fourth valve, and the third valve are respectively connected to the high circulatory feedback port, the middle circulatory feedback port, and the low circulatory feedback port, the inlets of the fifth valve, the fourth valve, and the third valve are connected to an outlet of the concentration meter and an inlet of the eleventh valve, the concentration meter, the first underflow pump, and the first valve are successively connected to each other and then to another discharging outlet of the collection cylinder.

The concentration of the underflow in the thickener is greater than or equal to 75 wt % during the paste filling, and is 65 wt % in the long-distance discharge of the tailing with high concentration.

The method of using the deep cone thickener with an underflow concentration rapid auto-adjustment specifically includes the following steps:

step 1, underground paste filling: feeding the tailing slurry with a mass percent concentration of 20-30 wt % from a mineral processing plant into the deep cone thickener through the feed pipe, adding the flocculant through the flocculant charging pipe, turning on the drive motor to make the rake start stirring to realize a deep thickening of the tailing slurry, wherein the mass percent concentration of the underflow in the deep cone thickener is greater than or equal to 75 wt %, then opening the eleventh valve to perform the paste filling;

step 2, the long-distance discharge over the ground: closing the eleventh valve, automatically turning on all underflow circulatory subsystems by the PLC control system to perform circulations of the three underflow circulatory subsystems at a high position and quickly adjust the mass percent concentration of the underflow in the deep cone thickener to 63 wt %-67 wt %, at this time, turning off the first underflow circulatory subsystem, and opening the eleventh valve to perform the long-distance discharge over the ground, when a height of a mud layer goes down to a middle position of the thickener pool wall, automatically switching the circulation at the high position to a circulation at a middle position or a low position, and when the concentration of the underflow is maintained at 65 wt %, automatically turning off all the underflow circulatory subsystems;

step 3, performing the paste filling again: closing the eleventh valve, turning on all the underflow circulatory subsystems by the PLC control system to perform circulations of the three underflow circulatory subsystems at the low position and quickly adjust the mass percent concentration of the underflow in the deep cone thickener to be greater than or equal to 75 wt %, at this time, turning off all the underflow circulatory subsystems and opening the eleventh valve to perform an underground backfill.

The above-mentioned technical solutions of the present invention have the following advantages.

The thickener includes three circulatory subsystems. Each subsystem includes circulations at a high position, a middle position, and a low position, which can quickly adjust the underflow concentration. Therefore, the present invention not only can satisfy the requirement of high concentration underflow for underground backfill but also can satisfy the requirement of high concentration for filling the subsidence area on the ground. Also, the present invention can realize the rapid switch between different high concentrations. Thus, there is no need to use two sets of deep cone thickener with different underflow concentrations, thereby reducing the cost, shortening the time for adjusting the concentration, and also increasing the efficiency. Meanwhile, the underground paste filling of the tailing and the discharge of tailing with high concentration over the ground can be achieved based on the present invention. As a result, the solid wastes such as tailings can be effectively disposed, while the goaf risk can be avoided. The thickener has the features of high efficiency, environment friendly, and high practicality, and can provide effective and reliable equipment for the paste filling technology, so it has a great application value and is suitable for the metal or nonmetal mining enterprises.

Figure 1:
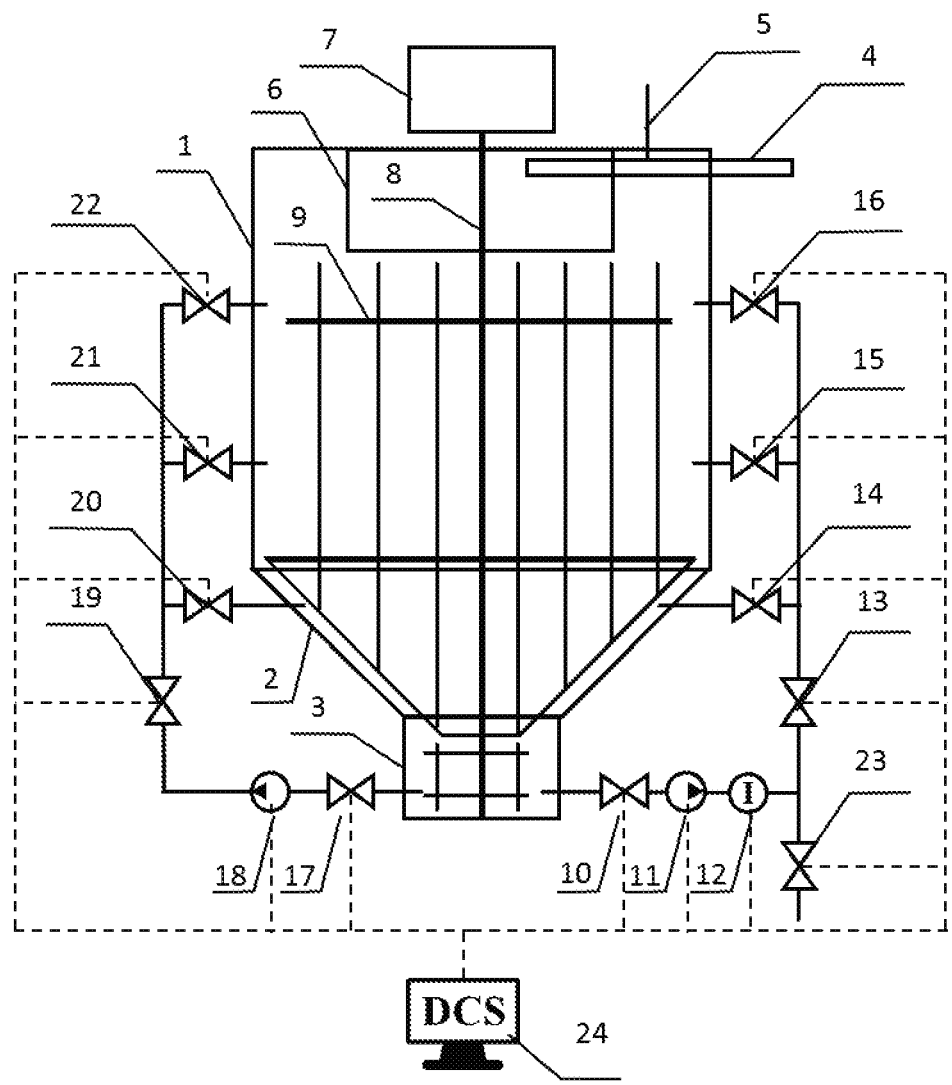
FIG. 1 is a structural diagram showing the major part of a deep cone thickener with an underflow concentration rapid auto-adjustment according to the present invention.

The reference numerals in the drawings are described below:

2. thickener pool wall, 2. cone body, 3. collection cylinder, 4. feed pipe, 5. flocculant charging pipe, 6. central feed well, 7. drive motor, 8. drive shaft, 9. rake, 10. first valve, 11. first underflow pump, 12. concentration meter, 13. second valve, 14. third valve, 15. fourth valve, 16. fifth valve, 17. sixth valve, 18. second underflow pump, 19. seventh valve, 20. eighth valve, 21. ninth valve, 22. tenth valve, 23. eleventh valve, 24. PLC control system, 25. twelfth valve, 26. third underflow pump.

DETAILED DESCRIPTION OF THE EMBODIMENTS

In order to clarify objectives, the technical solutions, and advantages of the present invention, the present invention will be described in detail hereinafter with reference to the drawings and specific embodiments.

The present invention provides a deep cone thickener with an underflow concentration rapid auto-adjustment.

As shown in FIG. 1, the thickener includes a shell body, a dilution flocculation system, a shearing dewatering system, an underflow circulatory system, and an auto-control system, wherein the shell body includes the thickener pool wall 1, the cone body 2, and the collection cylinder 3, the thickener pool wall 1 is located at the exterior of the thickener, the cone body 2 is located below the thickener pool wall 1, and the collection cylinder 3 is located below the cone body 2; the dilution flocculation system includes the feed pipe 4, the flocculant charging pipe 5, and the central feed well 6, wherein the central feed well 6 is located at the inner upper part the thickener pool wall 1, and the feed pipe 4 is located at the upper part of one side of the central feed well 6, one end of the feed pipe 4 penetrates through the thickener pool wall 1 and extends to the interior of the central feed well 6, and the flocculant charging pipe 5 is vertically connected to the feed pipe 4 from the upper side of the feed pipe 4; the shearing dewatering system includes the drive motor 7, the drive shaft 8, and the rake 9, wherein the drive motor 7 is located at the outer upper part of the thickener pool wall 1, the drive shaft 8 and the rake 9 are located inside the thickener pool wall 1, and the drive motor 7 is connected to the rake 9 through the drive shaft 8; the underflow circulatory system includes three circulatory subsystems, each circulatory subsystem includes a discharging valve, an underflow pump, and a circulatory pipe, the inlets of the underflow pumps are connected to the discharging outlets of the collection cylinder 3, and the outlets of the underflow pumps are connected to a high circulatory feedback port and a middle circulatory feedback port of the thickener pool wall 1 and a low circulatory feedback port of the cone body 2 through a high circulatory pipeline, a middle circulatory pipeline, and a low circulatory pipeline, respectively, the high circulatory feedback port, the middle circulatory feedback port, and the low circulatory feedback port are provided with discharging valves on the high circulatory pipeline, the middle circulatory pipeline, and the low circulatory pipeline, respectively; the auto-control system includes the PLC control system 24 that is connected to the underflow pumps, a concentration meter 12, and the discharging valves.

The discharging valves include the first valve 10, the second valve 13, the third valve 14, the fourth valve 15, the fifth valve 16, the sixth valve 17, the seventh valve 19, the eighth valve 20, the ninth valve 21, the tenth valve 22, the eleventh valve 23, and the twelfth valve 25, and the underflow pumps include the first underflow pump 11, the second underflow pump 18, and the third underflow pump 26.

Figure 2:
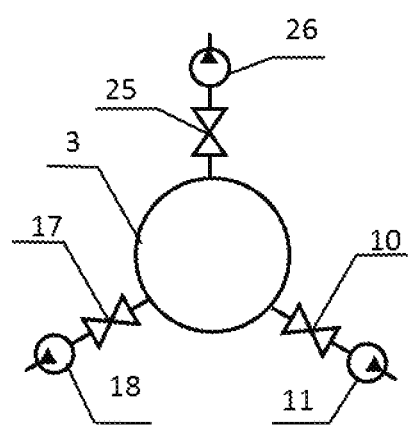
FIG. 2 is a top view of a discharging outlet of a collection cylinder of the present invention.

As shown in FIG. 1 and FIG. 2, the number of the high circulatory feedback ports, the middle circulatory feedback ports, the low circulatory feedback ports, and the discharging outlets are all three, the three high circulatory feedback ports are all located at the same cross-section of the thickener pool wall 1 with an angle of 120° to each other, the three middle circulatory feedback ports, the three low circulatory feedback ports, and the three discharging outlets are vertically aligned with the corresponding high circulatory feedback ports; the centers of the high circulatory feedback ports are located at positions with about one third height distance of the thickener pool wall lower than the top of the thickener pool wall 1 in the vertical direction, the centers of the middle circulatory feedback ports are located at positions with about one fifth height distance of the thickener pool wall higher than the bottom of the thickener pool wall 1 in the vertical direction, the centers of the low circulatory feedback ports are located at positions with about one fifth height distance of the cone body lower than the top of the cone body 2 in the vertical direction, and the centers of the discharging outlets are located at positions with about one fourth height distance of the collection cylinder higher than the bottom of the collection cylinder 3 in the vertical direction.

As shown in FIG. 2, two of the three circulatory subsystems of the underflow circulatory system have the same structure, wherein the first circulatory subsystem includes the sixth valve 17, the second pump 18, the seventh valve 19, the eighth valve 20, the ninth valve 21, and the tenth valve 22, the tenth valve 22, the ninth valve 21, and the eighth valve 20 are respectively connected to the high circulatory feedback port, the middle circulatory feedback port, and the low circulatory feedback port, the inlets of the tenth valve 22, the ninth valve 21 and the eighth valve 20 are successively connected to the seventh valve 19, the second pump 18 and the sixth valve 17 and then to a discharging outlet of the collection cylinder 3; the second circulatory subsystem has the same structure as the first circulatory subsystem; the third circulatory subsystem includes the first valve 10, the first underflow pump 11, the concentration meter 12, the third valve 14, the fourth valve 15, the fifth valve 16, and the eleventh valve 23, the fifth valve 16, the fourth valve 15, and the third valve 14 are respectively connected to the high circulatory feedback port, the middle circulatory feedback port, and the low circulatory feedback port, the inlets of the fifth valve 16, the fourth valve 15, and the third valve 14 are connected to the outlet of the concentration meter 12 and the inlet of the eleventh valve 23, the concentration meter 12, the first underflow pump 11, and the first valve 10 are successively connected to each other and then to the other discharging outlet of the collection cylinder 3.

In practice, the method of using the deep cone thickener with an underflow concentration rapid auto-adjustment specifically includes the following steps:

S1, the underground paste filling: the tailing slurry with a mass percent concentration of 20-30 wt % from a mineral processing plant is fed into the deep cone thickener through the feed pipe 4, the flocculant is added through the flocculant charging pipe 5, the drive motor 7 is turned on to make the rake 9 start stirring to realize the deep thickening of the tailing slurry; the mass percent concentration of the underflow in the deep cone thickener is greater than or equal to 75 wt %, then the eleventh valve 23 is opened to perform the paste filling;

S2, the long-distance discharge over the ground: the eleventh valve 23 is closed, all underflow circulatory subsystems are automatically turned on by the PLC control system 24 to perform circulations of the three underflow circulatory subsystems at the high position and quickly adjust the mass percent concentration of the underflow in the deep cone thickener to 63 wt %-67 wt %, at this time, the first underflow circulatory subsystem is turned off, and the eleventh valve 23 is opened to perform the long-distance discharge over the ground, when a height of a mud layer goes down to the middle position of the thickener pool wall, the circulation at the high position automatically switched to the circulation at the middle position or a low position, and when the concentration of the underflow is maintained at 65 wt %, all the underflow circulatory subsystems are automatically turned off;

S3, performing the paste filling again: the eleventh valve 23 is closed, all the underflow circulatory subsystems are turned on by the PLC control system 24 to perform the circulations of the three underflow circulatory subsystems at the low position and quickly adjust the mass percent concentration of the underflow in the deep cone thickener to be greater than or equal to 75 wt %, at this time, all the underflow circulatory subsystems are turned off and the eleventh valve 23 is opened to perform the underground backfill.

The specific embodiment of the present invention are described below.

As shown FIG. 1, the shell body of the deep cone thickener includes the thickener pool wall 1, the cone body 2, and the collection cylinder 3, and it should be noted that the shell body may also be a single piece without being divided into three parts; the dilution flocculation system is located at the upper part of the shell body and includes the feed pipe 4, the flocculant charging pipe 5, and the central feed well 6; the shearing dewatering system includes the drive motor 7, the drive shaft 8, and the rake 9, the drive motor 7 is located at the upper part of the shell body, the drive shaft 8 and the rake 9 are located inside the shell body; the underflow circulatory system includes the discharging valves, the underflow pumps, the circulatory pipes, and the concentration meter 12, etc., there are three circulatory subsystems evenly distributed outside the shell body, the circulatory subsystems are respectively connected to the lower part of the collection cylinder 3, the upper part of the cone body 2, the lower part and middle part of the thickener pool wall 1; the automatic control system includes the PLC control system 24, etc.

The side wall of the middle part of the thickener pool wall 1 is provided three high circulatory feedback ports which are evenly distributed around the thickener pool wall 1 at the same cross-section; the side wall of the lower part of the thickener pool wall 1 near the bottom is provided with three middle circulatory feedback ports which are evenly distributed around the thickener pool wall 1 at the same cross-section; the side wall of the upper part of the cone body 2 near the top is provided with three low circulatory feedback ports which are evenly distributed around the cone body 2 at the same cross-section; and the side wall of the lower part of the collection cylinder 3 near the bottom is provided with three discharging outlets which are evenly distributed around the collection cylinder 3 at the same cross-section.

In the practical design, the total height of the thickener is designed to be 10.8 meters, the center of the high circulatory feedback port is located at the position 3 meters lower than the top of the thickener pool wall 1, the center of the middle circulatory feedback port is located at the position 1.8 meters higher than the bottom of the thickener pool wall 1, the center of the low circulatory feedback port is located at the position 0.2 meters lower than the top of the cone body 2, and the center of the discharging outlet is located at the position 0.2 meters higher than the bottom of the collection cylinder 3.

The circulatory system includes three circulatory subsystems respectively connected to the discharging outlet of the collection cylinder 3, the feedback port of the cone body 2, and the feedback port of the thickener pool wall 1. The inlets of the underflow pumps are connected to the discharging outlets, while the outlets of the underflow pumps are respectively connected to the high circulatory feedback port, the middle circulatory feedback port, and the low circulatory feedback port through the high circulatory pipeline, the middle circulatory pipeline, and the low circulatory pipeline, and the three feedback ports, the high circulatory pipeline, the middle circulatory pipeline, and the low circulatory pipeline are all provided with discharging valves, the discharging valves include the first valve 10, the second valve 13, the third valve 14, the fourth valve 15, the fifth valve 16, the sixth valve 17, the seventh valve 19, the eighth valve 20, the ninth valve 21, the tenth valve 22, the eleventh valve 23, and the twelfth valve 25, the underflow pumps include the first underflow pump 11, the second underflow pump 18, and the third underflow pump 26. The concentration meter 12 is provided between the outlet of the first underflow pump 11 of one of the circulatory subsystems and the circulatory pipes. The inlet of the concentration meter 12 is connected to the outlet of the first underflow pump 11. The outlet of the concentration meter 12 is connected to the circulatory pipes and the discharging pipe. The discharging pipe is provided with the eleventh valve 23.

The PLC control system 24 is connected to the underflow pump, the concentration meter 12, and the discharging valve, respectively.

In practical application, the tailing slurry with a mass percent concentration of about 20 wt % from the mineral processing plant is fed into the central feed well 6 of the deep cone thickener through the feed pipe 4, the flocculant is added through the flocculant charging pipe 5, the control system automatically turns on the drive motor 7 to make the rake 9 starts stirring, so as to realize the deep thickening of the tailing slurry, when the mass percent concentration of the underflow in the deep cone thickener is greater than or equal to 75 wt %, the eleventh valve 23 is automatically opened for the underground backfill;

when there is no need for the underground backfill, the long-distance discharge of the tailings over the ground is carried out: the PLC control system automatically turns on all the circulatory systems and closes the eleventh valve 23, the three subsystems all perform circulations at the high position, the mass percent concentration of the underflow in the deep cone thickener is quickly adjusted to around 65 wt %, at this time, the first circulatory subsystem is closed and the eleventh valve 23 is opened to proceed the long-distance discharge over the ground. When the height of the mud layer goes down to a certain position, the circulation at the high position will be automatically switched to the circulation at the middle position or the low position, and when the underflow concentration is maintained at around 65 wt %, all circulatory subsystems are automatically turned off;

when there is a need for the underground backfill again, the eleventh valve 23 is closed and all the circulatory subsystems are turned on by the PLC control system, the three subsystems all perform the circulation at the low position, the mass percent concentration of the underflow in the deep cone thickener is quickly adjusted to be greater than or equal to 75 wt %, at that time, all the circulatory systems are turned off and the eleventh valve 23 is turned on for the underground backfill.

The preferred embodiment of the present invention is described above. It should be noted that various improvements and modifications can be made by those of ordinary skill in the art without departing from the principle of the present invention, these improvements and modifications should also be considered as falling within the scope of the present invention.

What is claimed is:

1. A deep cone thickener with an underflow concentration rapid auto-adjustment comprising a shell body, a dilution flocculation system, a shearing dewatering system, an underflow circulatory system, and an auto-control system, wherein the shell body comprises a thickener pool wall, a cone body, and an collection cylinder; the thickener pool wall is located at an exterior of the thickener, the cone body is located below the thickener pool wall, and the collection cylinder is located below the cone body;

wherein the dilution flocculation system comprises a feed pipe, a flocculant charging pipe, and a central feed well; the central feed well is located at an inner upper part the thickener pool wall, the feed pipe is located at an upper part of one side of the central feed well, an end of the feed pipe penetrates through the thickener pool wall and extends to an interior of the central feed well, and the flocculant charging pipe is vertically connected to the feed pipe from an upper side of the feed pipe;

wherein the shearing dewatering system comprises a drive motor, a drive shaft, and a rake; the drive motor is located at an outer upper part of the thickener pool wall, the drive shaft and the rake are located inside the thickener pool wall, and the drive motor is connected to the rake through the drive shaft;

wherein the underflow circulatory system comprises three circulatory subsystems; each of the three circulatory subsystem comprises a discharging valve, an underflow pump, and a circulatory pipe; inlets of the underflow pumps are connected to discharging outlets of the collection cylinder, and outlets of the underflow pumps are connected to a high circulatory feedback port and a middle circulatory feedback port of the thickener pool wall and a low circulatory feedback port of the cone body through a high circulatory pipeline, a middle circulatory pipeline, and a low circulatory pipeline, respectively; the high circulatory feedback port, the middle circulatory feedback port, and the low circulatory feedback port are provided with discharging valves on the high circulatory pipeline, the middle circulatory pipeline; and the low circulatory pipeline, respectively; and wherein the auto-control system comprises a PLC control system; the PLC control system is connected to the underflow pumps, a concentration meter, and the discharging valves;

two of the three circulatory subsystems of the underflow circulatory system have a same structure, a first circulatory subsystem comprises a sixth valve, a second underflow pump, a seventh valve, an eighth valve, a ninth valve, and a tenth valve, wherein the tenth valve, the ninth valve, and the eighth valve are respectively connected to the high circulatory feedback port, the middle circulatory feedback port, and the low circulatory feedback port, inlets of the tenth valve, the ninth valve, and the eighth valve are successively connected to the seventh valve, the second underflow pump; and the sixth valve and then to a discharging outlet of the collection cylinder;

wherein a second circulatory subsystem has a same structure as the first circulatory subsystem;

wherein a third circulatory subsystem comprises a first valve, a first underflow pump, the concentration meter, a second valve, a third valve, a fourth valve, a fifth valve, and an eleventh valve, wherein the fifth valve, the fourth valve, and the third valve are respectively connected to the high circulatory feedback port, the middle circulatory feedback port, and the low circulatory feedback port, inlets of the fifth valve, the fourth valve, and the third valve are connected to an outlet of the concentration meter and an inlet of the eleventh valve; and the concentration meter, the first underflow pump, and the first valve are successively connected to each other, then to another discharging outlet of the collection cylinder; and a mass percent concentration of the underflow in the thickener is greater than or equal to 75 wt % during a paste filling, and the mass percent concentration of the underflow in the thickener is 65 wt % in a long-distance discharge of the tailing with a high concentration.

2. The deep cone thickener with an underflow concentration rapid auto-adjustment according to claim 1, wherein the discharging valves comprise the first valve, the second valve, the third valve, the fourth valve, the fifth valve, the sixth valve, the seventh valve, the eighth valve, the ninth valve, the tenth valve, the eleventh valve, a twelfth valve, and the underflow pumps comprise the first underflow pump, the second underflow pump, and a third underflow pump.

3. The deep cone thickener with an underflow concentration rapid auto-adjustment according to claim 1, wherein numbers of the high circulatory feedback ports, the middle circulatory feedback ports, the low circulatory feedback ports, and the discharging outlets are all three; the three high circulatory feedback ports are all located at a same cross-section of the thickener pool wall with an angle of 120° to each other; the three middle circulatory feedback ports, the three low circulatory feedback ports, and the three discharging outlets are vertically aligned with the three high circulatory feedback ports; centers of the high circulatory feedback ports are located at positions with about one third height distance of the thickener pool wall lower than a top of the thickener pool wall in a vertical direction; centers of the middle circulatory feedback ports are located at positions with about one fifth height distance of the thickener pool wall higher than a bottom of the thickener pool wall in the vertical direction; centers of the low circulatory feedback ports are located at positions with about one fifth height distance of the cone body lower than a top of the cone body in the vertical direction; and centers of the discharging outlets are located at positions with about one fourth height distance of the collection cylinder higher than a bottom of the collection cylinder in the vertical direction.

4. A method of using the deep cone thickener with an underflow concentration rapid auto-adjustment of claim 1 comprising:

underground paste filling: feeding a tailing slurry with a mass percent concentration of 20-30 wt % from a mineral processing plant into the deep cone thickener through the feed pipe, adding the flocculant through the flocculant charging pipe, turning on the drive motor to make the rake start stirring to realize a deep thickening of the tailing slurry, when the mass percent concentration of the underflow in the deep cone thickener is greater than or equal to 75 wt %, opening the eleventh valve to perform the underground paste filling;

long-distance discharge over the ground: closing the eleventh valve, automatically turning on all the underflow circulatory subsystems by the PLC control system to perform circulations of the three underflow circulatory subsystems at a high position and quickly adjust the mass percent concentration of the underflow in the deep cone thickener to 63 wt %-67 wt %, at this time, turning off a first underflow circulatory subsystem, and opening the eleventh valve to perform the long-distance discharge over the ground, when a height of a mud layer goes down to a middle position of the thickener pool wall, automatically switching the circulation at the high position to a circulation at a middle position or a low position, and when the mass percent concentration of the underflow is maintained at 65 wt %, automatically turning off all the underflow circulatory subsystems;

performing the underground paste filling again: closing the eleventh valve, turning on all the underflow circulatory subsystems by the PLC control system to perform circulations of the three underflow circulatory subsystems at the low position and quickly adjust the mass percent concentration of the underflow in the deep cone thickener to be greater than or equal to 75 wt %, at this time, turning off all the underflow circulatory subsystems and opening the eleventh valve to perform the underground paste filling.

* * * * *